Aug. 6, 1935.  S. B. SMITH  2,010,704
TWO-STROKE CYCLE INTERNAL COMBUSTION ENGINE
Filed July 1, 1930  3 Sheets-Sheet 3

INVENTOR
SAMUEL B. SMITH
BY
Ely &
Barrows
ATTORNEYS

Patented Aug. 6, 1935

2,010,704

UNITED STATES PATENT OFFICE 2,010,704

TWO-STROKE CYCLE INTERNAL COMBUSTION ENGINE

Samuel B. Smith, Rocky River, Ohio

Application July 1, 1930, Serial No. 465,138

7 Claims. (Cl. 123—65)

The present invention relates to certain new and useful improvements in engines, particularly of the compression ignition type, certain features of the invention being particularly adapted for engines of that style and type.

It is an object of the invention to provide a compression ignition type of engine in combination with a sleeve valve to control the ports. In combination with the sleeve valve there is arranged a new and improved ported ring and sealing means for the same.

A further object of the invention is to provide means for deflecting or directing the air which enters the engine, and is under compression longitudinally of and through the cylinder and toward the exhaust ports so as to quickly and effectively clear out the cylinder after firing. In combination with this means there is also provided means for clearing out the upper part of the firing chamber so that the products of combustion are blown out rapidly and effectively.

It is a further object of the invention to arrange and provide mechanism by which the sleeve valve is operated in proper timed relation to the periods of operation of the engine, the valve being so constructed and operated as to reduce the speed at which the same need be reciprocated, thereby rendering the engine more effective and reducing the wear upon the parts thereof. By the construction shown herein, a maximum port area is obtained, whereby the cylinder is rapidly charged and exhausted.

A further object is the arrangement of the exhaust port or ports so that the hot gases are prevented from leakage about the sleeve valve, whereby the sleeve valve and adjacent ports are protected from the injurious effects of the exhaust gases.

The various features, singly, or in various combinations as set forth, are the subject of the invention herein shown and described, it being specifically understood that the drawings and description are explanatory of the invention only, and that changes and modifications may be made in specific embodiments of the invention. It will also be appreciated that improvements and other adaptations of the particular features of the invention may be resorted to without in any manner avoiding or altering the scope of the invention.

In the drawings in which the best known or preferred form of the invention is illustrated:

Figure 1:
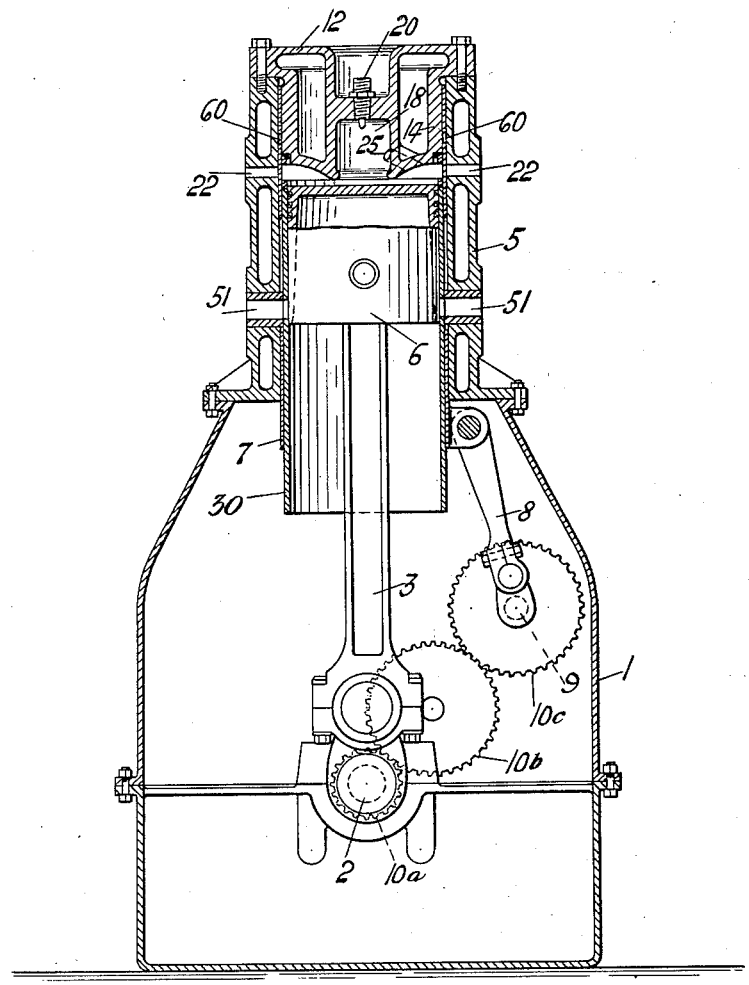
Figure 1 is a vertical sectional view through the engine.

In the drawings 1 indicates the usual crank case in which is located the crank shaft 2 to which is connected the series of connecting rods 3 for each of several cylinders 5, one only of which is illustrated. The piston is indicated at 10 6, and the single sleeve valve at 7, the latter being operated in timed relation to the movement of the piston, as will be described by means of a connecting link 8, operated from the valve operating crank shaft 9. The gearing for operating the valve crank shaft from the main crank shaft is indicated by 10a, 10b and 10c.

The main or outer water jacketed cylinder has been indicated at 5, being closed at its upper end by a water jacketed head 12, having a central boss or formation 14, which projects downwardly into the cylinder proper, being spaced from the inner wall thereof to provide the annular space 15, in which the upper end of the sleeve valve is reciprocated. Located in the boss 12 is a space 18 which forms the firing chamber, the injector or nozzle for the liquid fuel being indicated at 20.

Oppositely positioned intake ports 22 are provided in the main cylinder through which the air, preferably in a strong blast or current from a compressor or fan is admitted to the cylinder when the ports are open. The depending portion of the head is preferably in line with the intake ports and its lowermost portion is formed with central downwardly curved or coned shaped surfaces 24, which serve the purpose of directing the inwardly entering air downwardly through the cylinder and toward the exhaust ports.

It will be noted that the products of combustion may be entrapped within the chamber 18, were no means provided especially intended for driving them out of this space. For this purpose, by-passes or lateral ducts 25 are opened from the outer surface of the head to the firing chamber, the entrance to these ducts being located opposite the intake ports so that a portion of the incoming air will be directed into the firing chamber. The general direction of these by-passes or ducts is upward and in a substantially tangential direction with respect to the firing chamber, so that as a result the air entering the firing chamber from opposite sides will be given a violent swirling movement which will effectively clear out or scavenge the chamber.

It will be apparent that a single intake port, or that a greater number than two may be employed, but the arrangement shown has been selected as securing the most efficient results.

Figure 3:
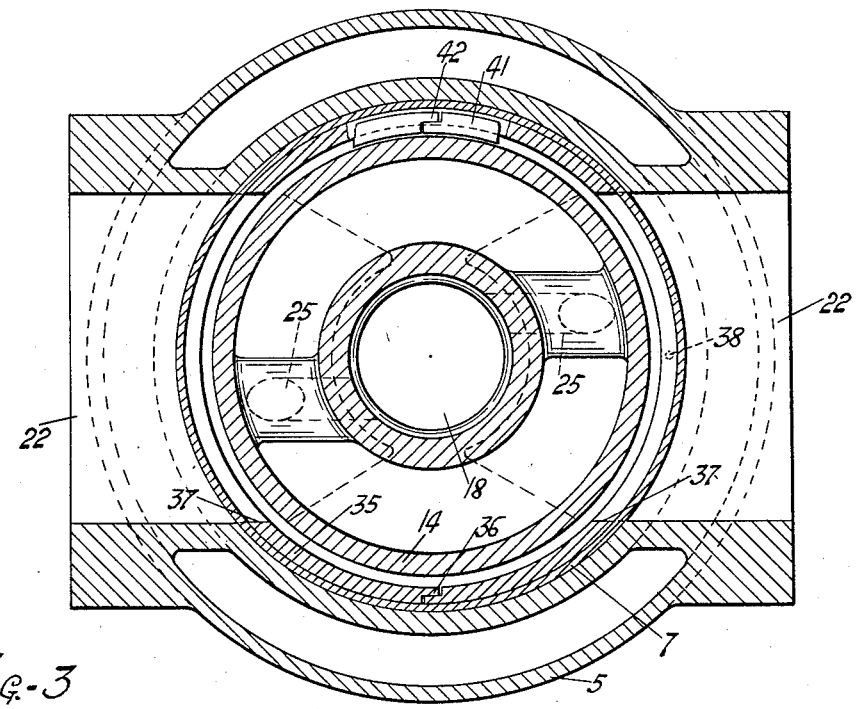
Figure 3 is a section on the line 3—3 of Figure 2.
Figure 4:
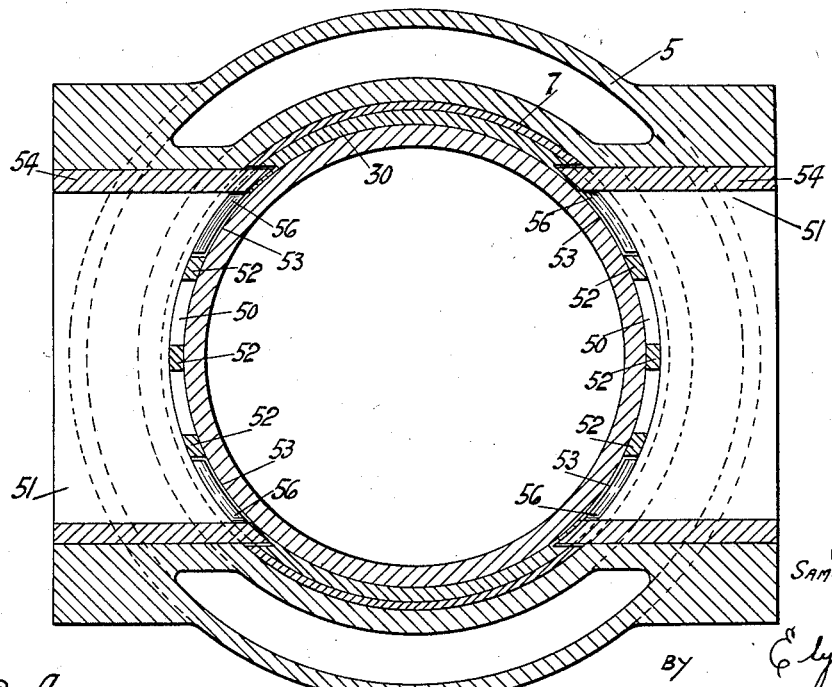
Figure 4 is a section on the line 4—4 of Figure 2.

Located within the main cylinder 5 is the inner cylinder or stationary sleeve 30 over which the sleeve valve 7 is reciprocated. The upper end of the sleeve terminates just below the port 22, and provides a seat 34 for a split expansible sealing ring 35, having the tongued overlap 36, as shown in Figure 3. The sealing ring is provided with two ports 37 to register with the ports 22. Rotation of the sealing ring is prevented by means of the pinned connection 38 with the sleeve 30. The pressure within the cylinder forces the sealing ring outwardly against the sleeve valve, and securely seals the passages between the valve and the ring.

In order to hold the sealing ring to its seat on top of the inner sleeve, its upper edge is beveled or wedged as shown at 40, and with this surface is arranged to cooperate a correspondingly beveled surface on a second or supplemental split sealing ring 41, having the overlapping tongued joint 42 therein, and being held against rotation by the pinned connection 44 to the head. The upper part of the main sealing ring and the whole of the supplemental sealing ring is located in the circular recess 45 in the head, and both the lower horizontal face and the inner face of the ring 41 is exposed to the pressure within the cylinder, so that the ring is forced upwardly to seal the space about the head, and outwardly to force the ring 35 down upon its seat through the medium of the coacting beveled or wedge surfaces. The construction of this form of sealing means is shown and claimed per se in my copending application Serial No. 464,654 filed June 28, 1930.

Near its lowermost point of travel the piston passes beyond the two exhaust ports 50, located in the inner sleeve, these ports communicating with exhaust ports 51 in the main cylinder. If desired, bridges 52 may be located in the ports in the inner cylinder to protect the piston rings. The exhaust ports are preferably lined with bushings 54, usually of cast iron, and these bushings extend to the inner sleeve, being provided with extensions 56 on either end thereof which enter the side ports 53, and support the inner cylinder. The bushings are intended to seal the spaces about the exhaust passages and to protect the sleeve valve and adjacent ports from the hot exhaust gases.

The sleeve valve 7, is provided with the oppositely positioned openings 60, which are spaced from the upper edge of the sleeve valve so as to allow the inlet ports to be closed by the sleeve valve above and below the openings. The sleeve valve is for this purpose moved to an extent sufficient to open the ports during its up and down strokes, making two openings and closings during a single cycle of the sleeve valve. Due to this new and valuable feature of the invention, the sleeve valve is reciprocated at one-half the speed of the piston. The gearing 10 between the shafts 2 and 9 is, therefore, proportioned to give the proper relative speed between these parts.

Figure 2:
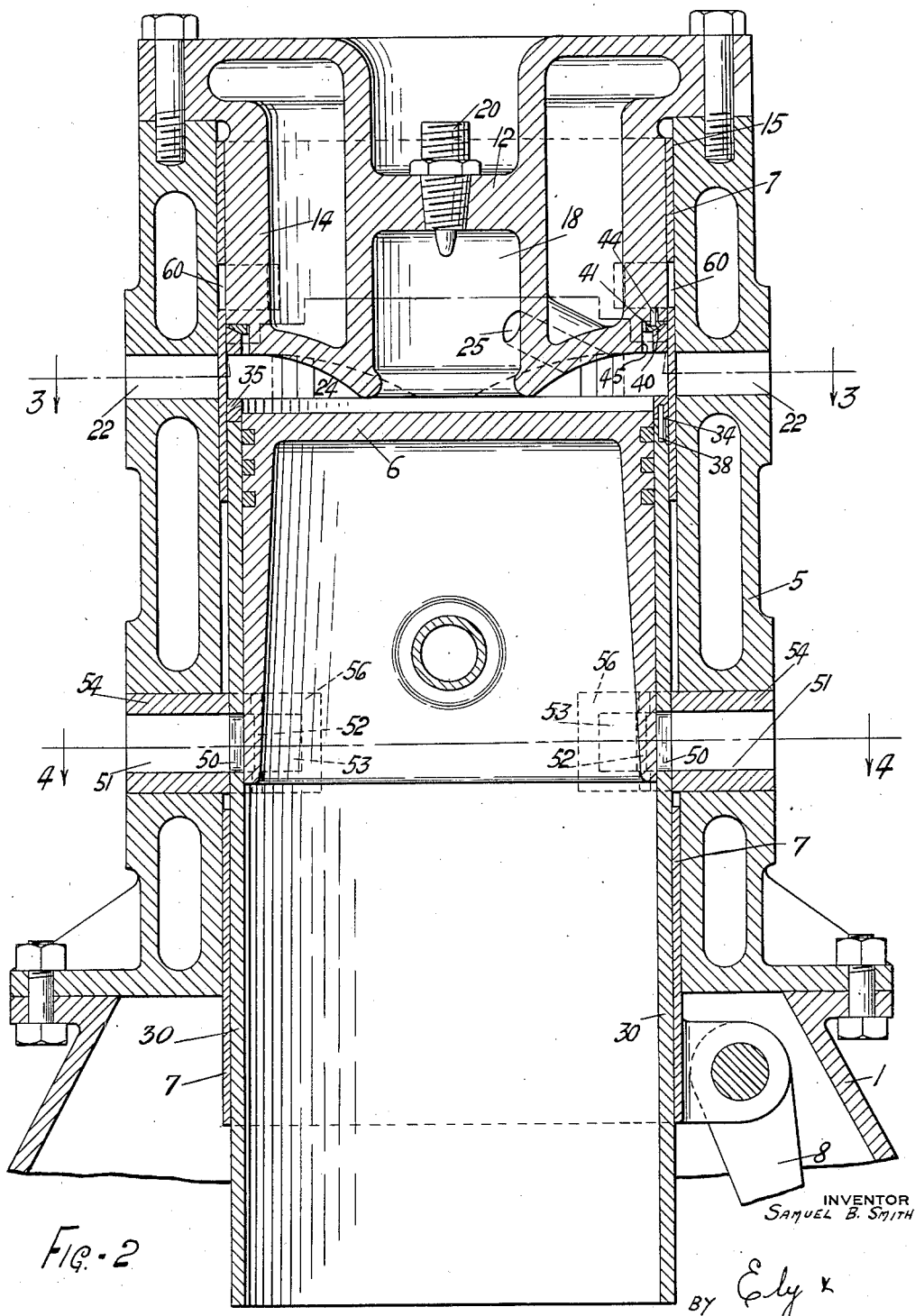
Figure 2 is an enlarged section of the cylinder.

The operation of the engine may be briefly summarized as follows. In the position shown in Figures 1 and 2, the air is under compression and the engine is fired by the admission of the jet of fuel through the injector, and the valve port 60 is at its uppermost position. The piston, near its lowermost point, uncovers the exhaust ports, this action commencing just prior to the registering of the ports 60 with the intake ports, so as to relieve the pressure within the engine. As the port 60 comes to register, the inrush of air through the ports 22 clears out the space within the engine, the air which enters the chamber 18 through the by passes 25 scavenging the chamber. As the piston begins its return stroke for compression of the entrapped fresh air, the intake ports are closed by the upper portion of the sleeve valve. The firing then takes place as before with the port 60 opening upon the upstroke of the sleeve valve. The sealing rings afford the requisite seal for compression as has been described.

It will be observed that a new and very effective engine structure of the two stroke cycle type has been provided, which is especially adapted for operation upon the principles of the compression ignition type of engine. Such changes as are suggested or may be designed by those skilled in this art which do not depart from the spirit and scope of the invention are intended to be covered herein.

What is claimed is:

1. In an engine of the compression ignition type, a cylinder, a head on the cylinder, a firing chamber in the head, an intake port, a portion of the head being located in front of the intake port and inclined to deflect the air longitudinally of the cylinder, said head having a duct leading from a point opposite the intake to the firing chamber.

2. In an engine of the compression ignition type, a cylinder, a head on the cylinder, a firing chamber in the head, an intake port, a portion of the head being located in front of the intake port and inclined to deflect the air longitudinally of the cylinder, and an exhaust port at the opposite end of the cylinder, said head having a duct leading from a point opposite the intake to the firing chamber.

3. In an engine of the compression ignition type, a cylinder, a head on the cylinder, a firing chamber in the head, an intake port, a portion of the head being located in front of the intake port and inclined to deflect the air longitudinally of the cylinder, said head having a duct leading upwardly from a point opposite the intake to the firing chamber, and discharging at an angle into the firing chamber.

4. In an engine of the compression ignition type, a cylinder, a head on the cylinder, a firing chamber in the head, an intake port, a portion of the head being located in front of the intake port and inclined to deflect the air longitudinally of the cylinder, and an exhaust port at the opposite end of the cylinder, said head having a duct leading upwardly from a point opposite the intake to the firing chamber, and discharging at an angle into the firing chamber.

5. An engine of the compression ignition type, comprising a main cylinder, a spaced stationary sleeve therein, oppositely positioned intake ports at the upper end of the cylinder, a reciprocating piston therein, exhaust ports at the lower end of the cylinder, a sleeve valve between the main cylinder and the sleeve to control the intake port, and a formation within the head of the cylinder adapted to direct the air as it enters through the intake ports toward the exhaust ports.

6. An engine of the compression ignition type, comprising a main cylinder, an intake port at the upper end of the cylinder, a head on the cylinder, a firing chamber in the head, a downwardly extending formation on the head surrounding the firing chamber, and located opposite the intake port, a duct extending through the formation and leading to the firing chamber, and an exhaust port at the lower end of the cylinder.

7. An engine of the compression ignition type, comprising a main cylinder, an intake port at the upper end of the cylinder, a head on the cylinder, a firing chamber in the head, a downwardly extending formation on the head surrounding the firing chamber, and located opposite the intake port, a duct extending through the formation and leading to the firing chamber at a tangent, and an exhaust port at the lower end of the cylinder.

SAMUEL B. SMITH.